United States Patent [19]

Ohta

[11] Patent Number: 4,710,821
[45] Date of Patent: Dec. 1, 1987

[54] IMAGE RECORDING APPARATUS

[75] Inventor: Shinichi Ohta, Kunitachi, Japan

[73] Assignee: Canon Kabushiki Kaisha, Tokyo, Japan

[21] Appl. No.: 743,352

[22] Filed: Jun. 10, 1985

[30] Foreign Application Priority Data

| Jun. 14, 1984 | [JP] | Japan | 59-122746 |
| Jun. 14, 1984 | [JP] | Japan | 59-122747 |
| Jul. 24, 1984 | [JP] | Japan | 59-153688 |
| Jul. 24, 1984 | [JP] | Japan | 59-153689 |
| Jul. 24, 1984 | [JP] | Japan | 59-153690 |

[51] Int. Cl.$^4$ .................. H04N 1/00; H04N 1/40
[52] U.S. Cl. ............................. 358/256; 358/280; 358/287; 358/297; 382/9; 382/44
[58] Field of Search ............. 358/256, 280, 287, 293, 358/296, 297; 382/44, 45, 9

[56] References Cited

U.S. PATENT DOCUMENTS

| 4,428,077 | 1/1984 | Shimada | 382/44 |
| 4,535,365 | 8/1985 | Sakamoto | 358/287 |
| 4,538,183 | 8/1985 | Kammo et al. | 358/280 |
| 4,570,187 | 2/1986 | Ono et al. | 358/287 |
| 4,591,904 | 5/1986 | Urabe et al. | 358/287 |

Primary Examiner—Edward L. Coles, Sr.
Attorney, Agent, or Firm—Fitzpatrick, Cella, Harper & Scinto

[57] ABSTRACT

An image recording apparatus has a memory for storing a plurality of image data, a read-out section for reading out a predetermined number of image data to be recorded from the memory in order to display them in substantially the same order as that for recording, a display section for displaying the read-out image data, and a recording section for reading out the image data to be recorded from the memory and for recording the read-out image data.

14 Claims, 27 Drawing Figures

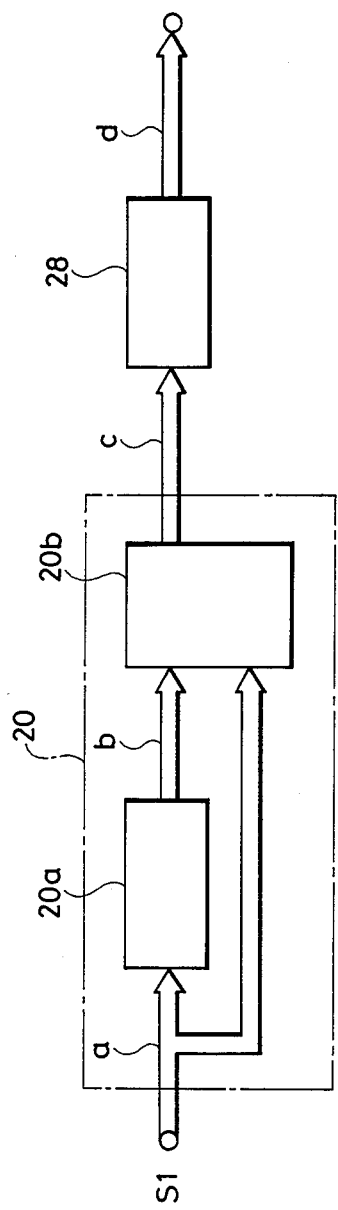

IMAGE RECORDING APPARATUS

BACKGROUND OF THE INVENTION

1. Field of the Invention

The present invention relates to an image recording apparatus for recording a plurality of images on a single recording medium, e.g., as a single hard copy.

2. Description of the Prior Art

A conventional multiformat camera is a so-called CRT camera. In such a camera, an image arrangement is programmed when a plurality of images are recorded. Each image is output onto the entire screen of the CRT one by one in accordance with the program, and each display image is recorded on a film by projection through a lens optical system.

FIG. 1 shows a case of a hard copy on a photographic film containing four frame images F1 to F4. In a conventional camera, the image F1 is output to the entire screen of the CRT and is photographed, and then the image F2 is output to the same CRT screen to photograph this image. In this manner, the four frame images F1 to F4 are sequentially recorded. However, during such operation, the operator may realize that the image F2 must be replaced with another image only after the image F2 is photographed, or that the image F2 must be arranged in place of the image F3. In such a case, the entire photographing operation must be performed again, and the current hard copy must simply be discarded.

In addition to the image arrangement shown in FIG. 1, a multiformat camera can provide an image arrangement of 6 frame images F1 to F6 as shown in FIG. 2. However, if the number of frames within an image arrangement is changed, the size of each image recorded is also changed. Therefore, if the operator realizes that the image arrangement as shown in FIG. 2 should have been adopted after recording the first image F1 in the image arrangement shown in FIG. 1, such a change requires starting the whole operation from the beginning. In the image arrangement shown in FIG. 2, when the recording operation is interrupted after recording the images F1, F2 and F3 and is then resumed, the images recorded before recording operation resumption can only be confirmed after a hard copy is obtained.

SUMMARY OF THE INVENTION

It is an object of the present invention to provide an image recording apparatus which allows by means of a display means confirmation of images which have been recorded before any other image is recorded.

It is another object of the present invention to provide an image recording apparatus which can display a plurality of images in place of a single image on a display means before any other image is recorded.

It is still another object of the present invention to provide an image recording apparatus which can display a plurality of images and which does not cause degradation in recorded image quality.

BRIEF DESCRIPTION OF THE DRAWINGS

FIG. 12 is a block diagram of a circuit for averaging pixels along the X direction and extracting pixels along the Y direction and for displaying resultant image data;

FIGS. 13a to 13d are timing-charts showing the contents at portions a to d in FIG. 12;

DESCRIPTION OF THE PREFERRED EMBODIMENTS

Figure 3A:
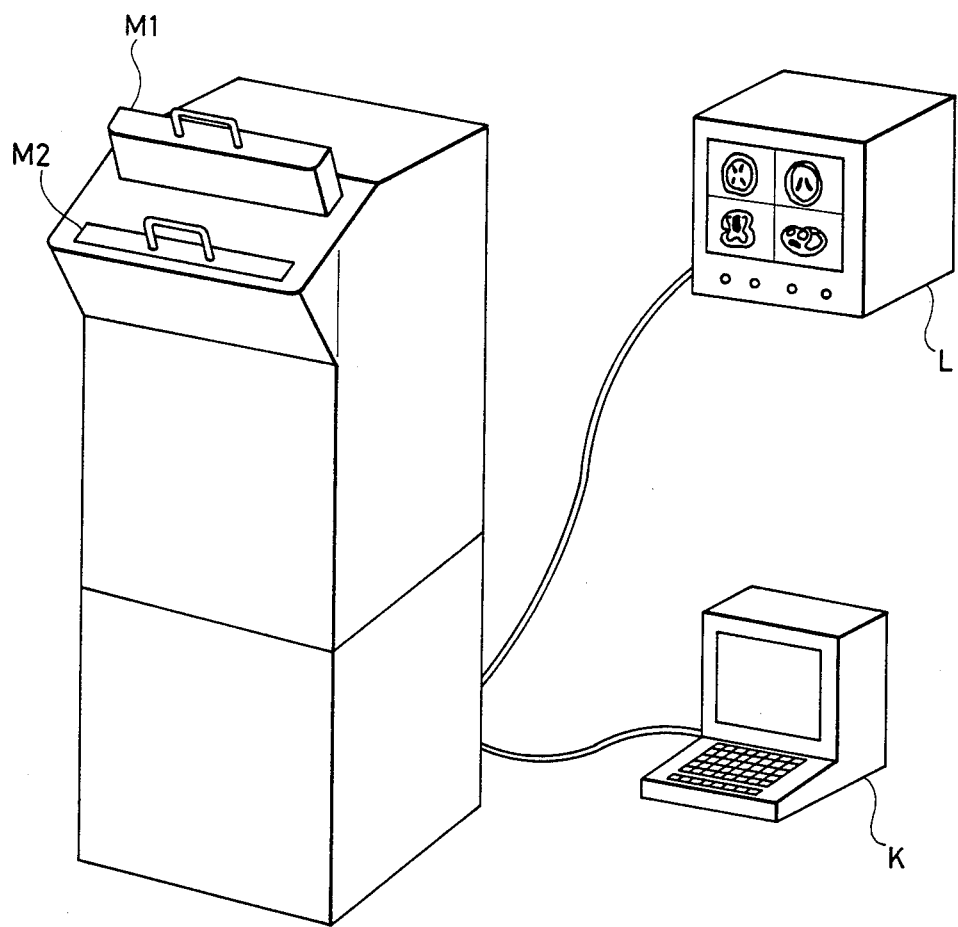
FIGS. 3A and 3B, respectively, are views showing the outer appearance and the internal configuration of an image recording apparatus according to the present invention.
Figure 3B:
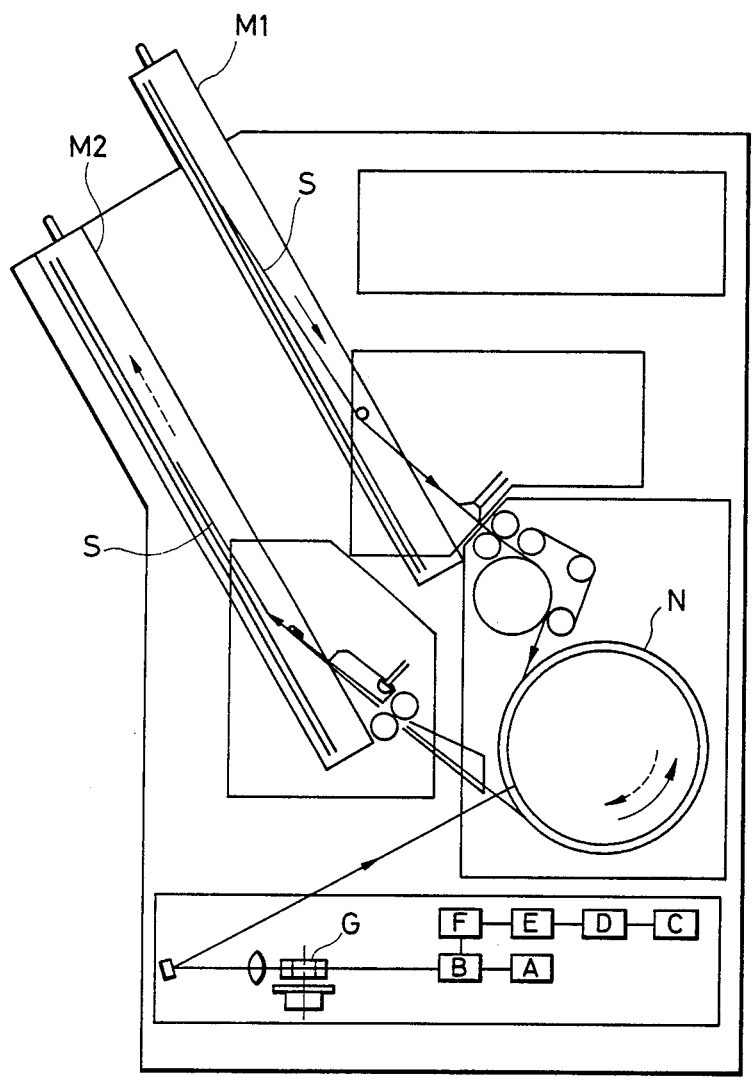

FIGS. 3A and 3B respectively show the schematic outer appearance and the internal configuration of an apparatus according to the present invention.

Referring to FIGS. 3A and 3B, a supply magazine M1 and a storage magazine M2 store recording sheets S. A monitor L displays a recording image. A keyboard K is used to input or change image data and to change an image arrangement. A recording sheet S is wound around a drum N for recording an image thereon. When the recording sheet S is supplied from the supply magazine M1 and an image is recorded thereon, the drum N is rotated in the direction indicated by a solid arrow (counterclockwise). When the image recording is completed and the recording sheet S is stored in the storage magazine M2, the drum N is rotated in the direction indicated by a dotted arrow (clockwise).

When an image is recorded, it can be completely recorded by a single rotation of the drum N. However, when an image is recorded by a plurality of rotations of the drum N, the memory capacity of a frame memory E to be described later can be reduced, and the overall apparatus can be rendered less expensive. The apparatus shown in FIG. 3B further includes a laser oscillator A, an acoustic optical element (A/O element) B, an analog medical image C by NMR, CT or ultrasonic processing, an A/D converter D, a frame memory E, a D/A converter F and a scanner G. A laser beam radiated from the laser oscillator A is modulated by the A/O element B connected to the frame memory E storing image data of the medical image C. The laser beam is scanned along the tangential direction (main scanning direction) of the drum N by the scanner G so as to record the image data on the recording sheet S rotating along the rotating direction (subscanning direction) of the drum N.

Figure 4:
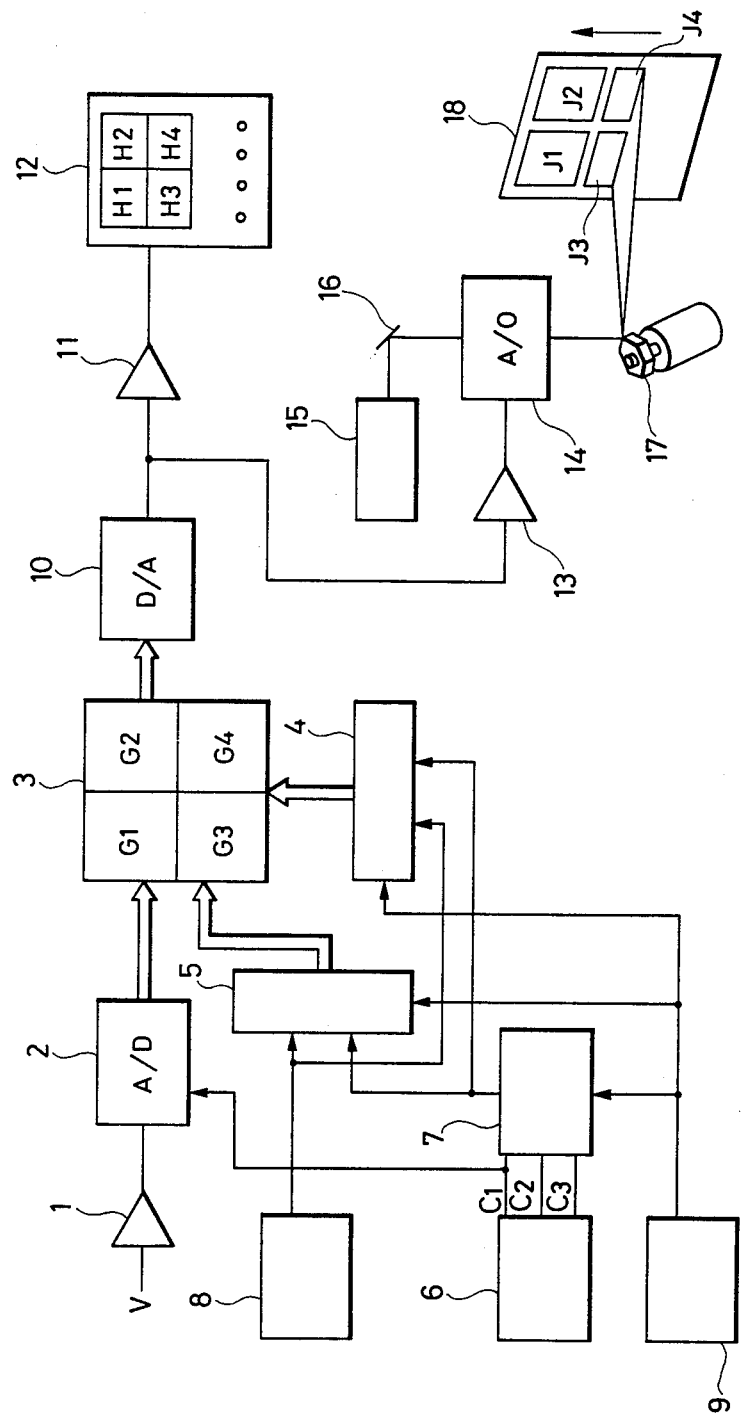
FIG. 4 is a block diagram of a first embodiment of the present invention wherein pixels of image data are extracted and displayed.

An embodiment of the present invention will now be described with reference to FIG. 4 wherein a recording image is displayed on a CRT before it is recorded.

Figure 1:
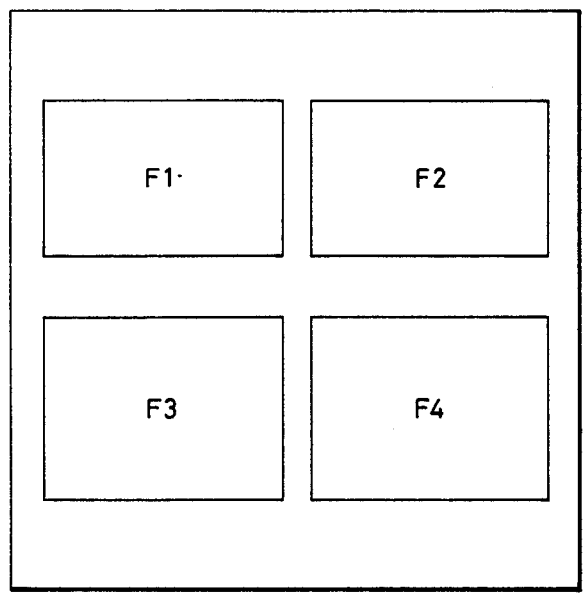
FIGS. 1 and 2 are illustrations for explaining arrangements on a single hard copy of four and six frame images, respectively.
Figure 5:
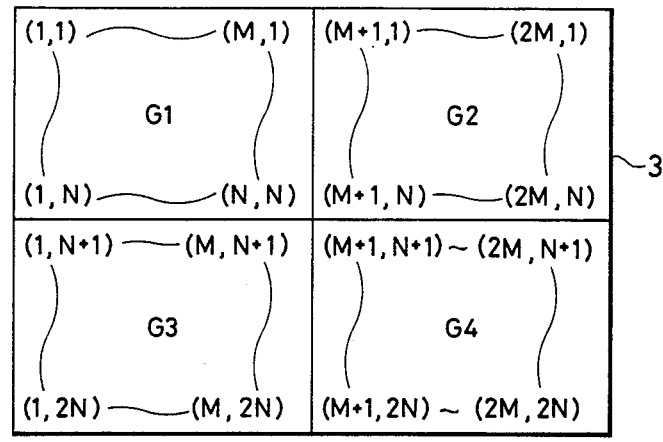
FIG. 5 is an illustration for explaining the state wherein image data of 4 frames is stored in a memory for storing a plurality of images.

An analog image signal V of the medical image C is digitized by an A/D converter 2 through an amplifier 1. The digital image from the A/D converter 2 is stored in a memory 3 (for storing a plurality of images) of the image frame memory E. Referring to FIG. 5, the memory format of the memory 3 is based on the image arrangement as shown in FIG. 1. More specifically, the image F1 is stored at addresses (1, 1) to (M,N) of an area G1, the image F2 is stored at addresses (M+1, 1) to (2N, N) of an area G2, the image F3 is stored at addresses (1, N+1) to (M, 2N) of an area G3, and the image F4 is stored at addresses (M+1, N+1) to (2M, 2N) of an area G4. An X address counter 4 and a Y address counter 5 are connected to a clock pulse generator 6, a multiplexer 7, a frame counter 8, and a controller 9 (e.g., a microcomputer). When image data is written in the memory 3, a clock pulse output C1 from the clock pulse generator 6 is selected by the multiplexer 7 under the control of the controller 9. When the image F1 is stored, the X and Y address counters 4 and 5 respectively generate addresses 1 to M and 1 to N, and the image data of the image F1 is written in the area G1 as shown in FIG. 5. When the image F2 is written, the X address counter 4 is controlled by the frame counter 8 to generate addresses M+1 to 2M, and the Y address counter 5 generates addresses 1 to N, thereby writing the image data of the image F2 in the area G2. This can be realized by constituting the X and Y address counters 4 and 5 by preset counters which are controlled by the frame counter 8. In a similar manner, the image data of the images F3 and F4 are written in the data areas G3 and G4, respectively.

A recording image is displayed on a CRT 12 through an amplifier 11. In practice, when a plurality of images are displayed on the CRT 12, the number of pixels of the CRT 12 is generally small. Therefore, an image having the number of pixels substantially the same as that of the CRT 12 cannot be displayed thereon. For this reason, the image data must be displayed after compression.

Figure 6A:
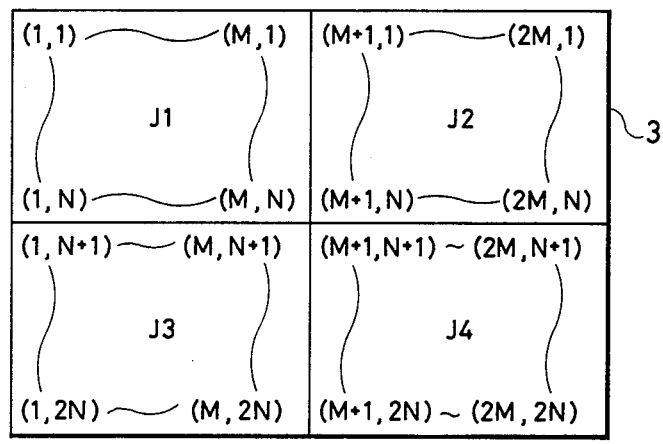
FIGS. 6A and 6B are illustrations for explaining recorded images and displayed images, respectively.
Figure 6B:
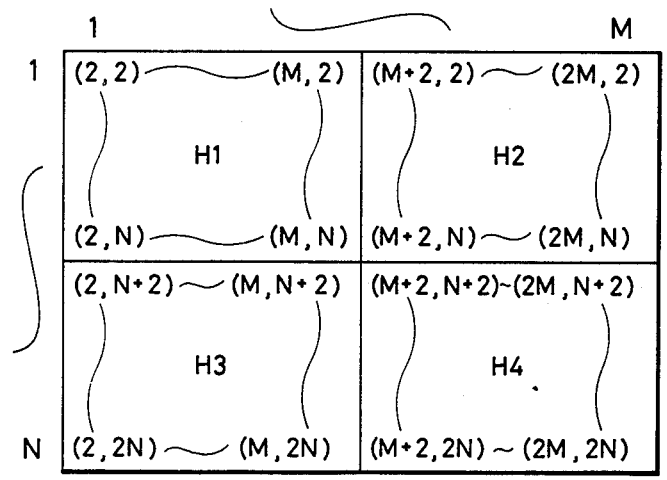

For this reason, when a plurality of images are displayed on the CRT 12, a clock signal C2 which is faster than an output C1 of the clock pulse generator 6 is selected by the multiplexer 7 under the control of the controller 9. The selected clock signal C2 drives the X and Y address counters 4 and 5. When the outputs from the X and Y address counters 4 and 5 are disabled for 1 bit, respectively, the LSBs of the outputs from the counters 4 and 5 are fixed at "0" or "1" and X and Y addresses produced become only either even or odd numbers. Therefore, every other address of the memory 3 is accessed and images H1 to H4 are displayed as shown in FIG. 6B. In this manner, since the number of pixels of the CRT 12 is small, every other pixel of the image data is omitted in the X or Y direction, and a synthetic image having a pixel density ¼ the original image is displayed. In this case, the X and Y address counters 4 and 5 respectively operate as a 2M-base counter and a 2N-base counter, respectively.

In this manner, when an image arrangement is confirmed based on the image displayed on the CRT 12 and the image is thereafter recorded, a clock signal C3 synchronized with a recording apparatus by the output from the clock pulse generator 6 is selected by the controller 9 and the multiplexer 7. As shown in FIG. 6, the X and Y address counters 4 and 5 output addresses (1, 1), (2M, 1), (1, 2) to (2M, 2), . . . , and (1, 2N) to (2M, 2N) so as to read-out the image data stored in the memory 3. The read-out image data from the memory 3 drive an acoustic optical element (A/O element) 14 through a D/A converter 10 and an amplifier 13. A laser beam from a laser oscillator 15 is deflected by a mirror 16, is luminance-modulated by the A/O element 14, and linearly scans a silver chloride film 18 by a rotating polyhedral mirror 17. The film 18 is moved in a direction perpendicular to the direction of linear scanning by the mirror 17 and images J1 to J4 corresponding to the images F1 to F4 shown in FIG. 1 are recorded.

Figure 7A:
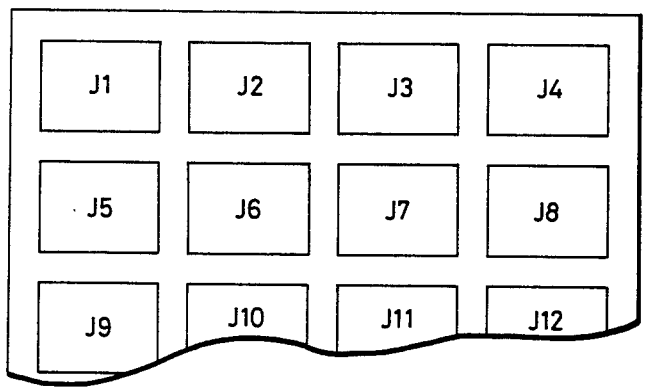
FIG. 7A shows an image arrangement of 12 frame images.
Figure 7B:
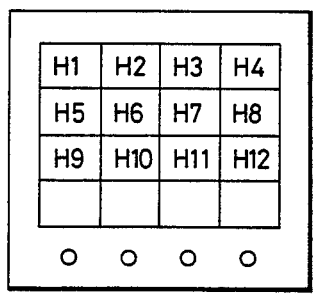
FIGS. 7B and 7C show two types of displayed images in which the image arrangements are substantially equivalent to the recorded image arrangements.
Figure 7C:
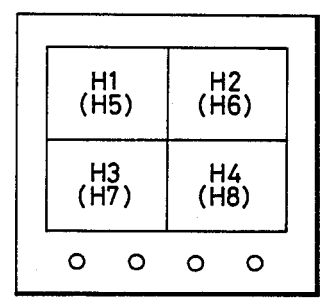

In this manner, the recording images are displayed on the CRT 12 with the same arrangement as that for recording. The same image arrangement herein means that it is not necessarily the same in both the row and column directions but that it is displayed with the image sequence not disturbing that for recording, i.e., the images are arranged substantially in the same sequence as that for recording. Therefore, when the images J1 to J12 as shown in FIG. 7A are recorded, they can be displayed as shown in FIG. 7B or as shown in FIG. 7C. Referring to FIG. 7C, the displayed images H1 to H4 or H5 to H8 are some of the recording images J1 to J12; however, they are displayed in the sequence not disturbing the actual recording sequence.

Figure 8A:
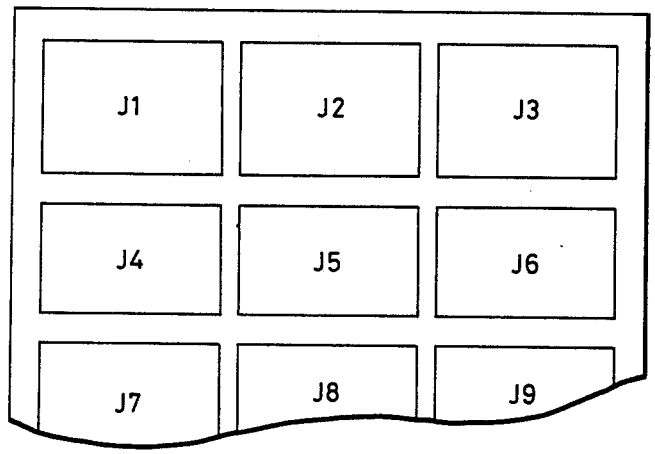
FIG. 8A shows an image arrangement of 9 frame images and FIGS. 8B and 8C show two types of displayed images in which the image arrangements are substantially equivalent to the recorded image arrangements.
Figure 8B:
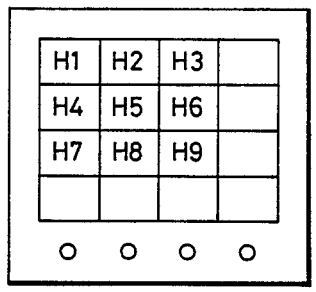
Figure 8C:
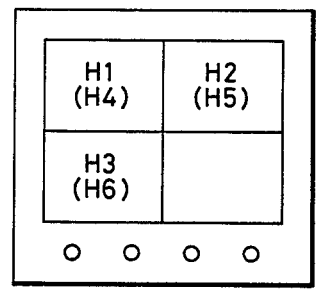

When the display shown in FIG. 7C is described in more detail, after the image H1 is displayed on the entire display screen, it is displayed at the upper left corner after compression. After the image H2 is displayed on the entire screen, it is displayed at the upper right corner after compression, thus displaying the images H1 and H2. When the images H1 to H4 are displayed in a similar manner after compression, after the image H5 is displayed on the entire screen, it is displayed at the upper left corner after compression. In this case, the images H1 to H4 are not displayed on the screen. The image H6 is displayed after compression together with the image H5 in a similar manner to that described above. When 1-frame image data, e.g., the image H1 only is displayed, the pixels at addresses the same as those of the write operation are read-out from the memory 3, and the read-out image data are displayed on the CRT 12 through the D/A converter 10 and the amplifier 11. In this manner, desired 1-frame image data is displayed by setting a corresponding frame number at the frame counter 8. In a similar manner, when images J1 to J9 are displayed as shown in FIG. 8A, they can be displayed as shown in FIG. 8B or as shown in FIG. 8C. When image data is displayed after compression, the compression method is not limited to extraction of some pixels as described above. According to another compression method, an average value of a plurality of pixels, for example, 4 pixels can be calculated, and thus 4 pixels can be converted into 1 pixel for display.

Figure 9:
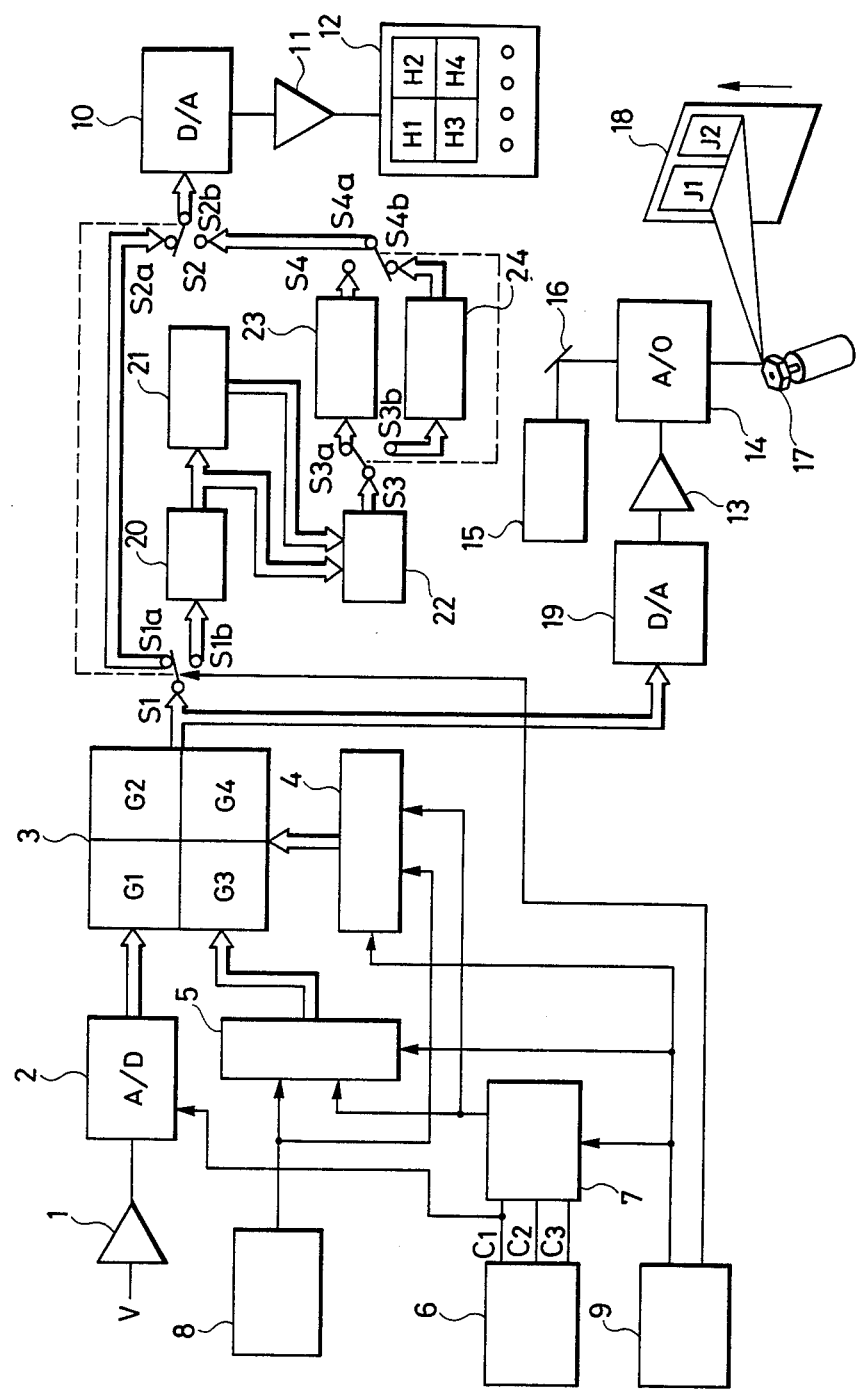
FIG. 9 is a block diagram of a second embodiment of the present invention wherein a plurality of pixels are averaged for display.

This method will be described with reference to another embodiment of the present invention which is shown in FIG. 9. The same reference numerals as in FIG. 4 denote the same parts in FIG. 9.

When a plurality of images are displayed on a CRT 12, a clock signal C2 faster than an output C1 from a clock pulse generator 6 is selected by a multiplexer 7 under the control of a controller 9. The selected clock signal C2 drives an X address counter 4 and a Y address counter 5. The X and Y address counters 4 and 5 are respectively a 2M-base counter and a 2N-base counter and sequentially generate addresses in the order of (1, 1) to (2M, 1), (1, 2) to (2M, 2), ..., and (1, 2N) to (2M, 2N) for accessing a memory 3. At this time, contacts S1$b$ and S2$b$ of switches S1 and S2 for averaging processing are selected by the controller 9. Outputs from the memory 3 are supplied to an adder 20. The adder 20 adds the sequentially supplied 2 pixels. This can be realized by incorporating a 1-pixel latch in the adder 20. The image data of the first line read-out from addresses (1, 1) to (2M, 1) of the memory 3 are added by the adder 20 in the order of (1, 1)+(2, 1), (3, 1)+(4, 1), ..., (2M-1, 0)+(2M, 1), and the sum data is stored in a line memory 21. The adder 20 similarly performs the addition operation for the image data of the next line read-out from addresses (1, 2) to (2M, 2) of the memory 3. An adder 22 adds the sum data of the second line with the sum data of the first line which is stored in the line memory 21. More specifically, the output (1, 2)+(2, 2) from the adder 20 is added to the output (1, 1)+(2, 1) from the line memory 21 by the adder 22. The sum data from the adder 22 is shifted to omit the lower 2 bits and the resulting data is stored in a line memory 23 through a contact S3$a$ of a switch S3. Thus, after (1, 1)+(2, 1)+(1, 2)+(2, 2) is calculated, the lower 2 bits of the sum data are omitted to reduce the image to ¼ the original image data and to provide an average value of 2×2=4 pixels.

In a similar manner, the output (3, 2)+(4, 2) from the adder 20 is added to the outputs (3, 1)+(4, 1), ..., (2M-1, 2)+(2M, 2) and (2M-1, 1)+(2M, 1) from the line memory 21, and the resultant data is shifted. The obtained data is stored in the line memory 23. When the third and fourth lines of the data read out from the memory 3 are calculated, a contact S3$b$ of the switch S3 is selected, and the obtained data is stored in a line memory 24 similar to the line memory 23. At this time, a contact S4$a$ of a switch S4 is selected so as to read-out image data from the line memory 23 and to display the read-out image data on the CRT 12 through a D/A converter 10 and an amplifier 11. When the calculated result for the third and fourth lines is stored in the line memory 24, the switches S3 and S4 are inverted, and the calculated result for the fifth and sixth lines is stored in the line memory 23. During this time, data is read-out from the line memory 24 and is displayed. In this manner, the two line memories 23 and 24 are alternately used to allow display on the CRT 12 of synthetic images H1 to H4 obtained by averaging each four pixels of the original images in correspondence with the images F1 to F4 shown in FIG. 1 without delay.

When an arrangement of images is confirmed by the displayed images on the CRT 12 and the images are then recorded, a signal C3 synchronized with a recording apparatus by an output from the clock pulse generator 6 is selected by the controller 9 and the multiplexer 7. The X and Y address counters 4 and 5 generate addresses in the order of (1, 1) to (2M, 1), (1, 2) to (2M, 2), ..., and (1, 2N) to (2M, 2N) so as to read-out corresponding image data from the memory 3.

Figure 2:
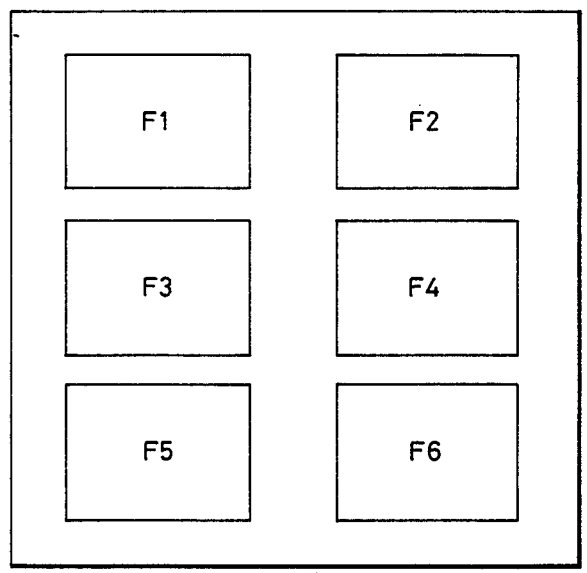
Figure 10:
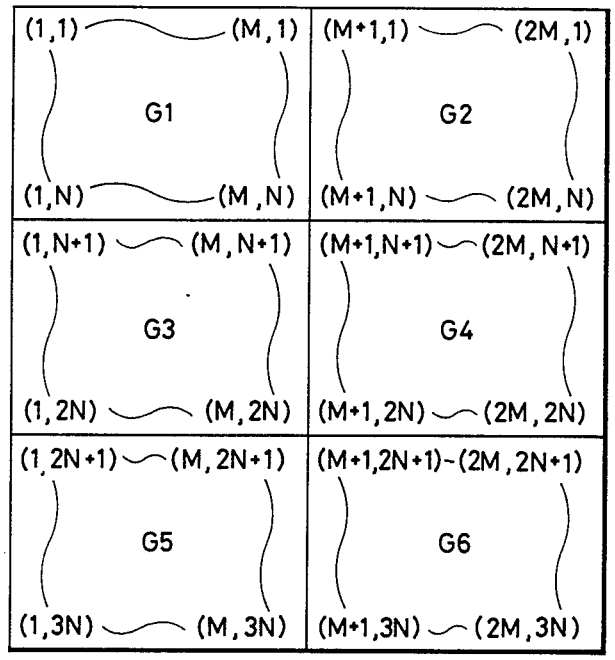
FIG. 10 is an illustration for explaining the state wherein image data of 6 frames is stored in a memory for storing a plurality of images.
Figure 11:
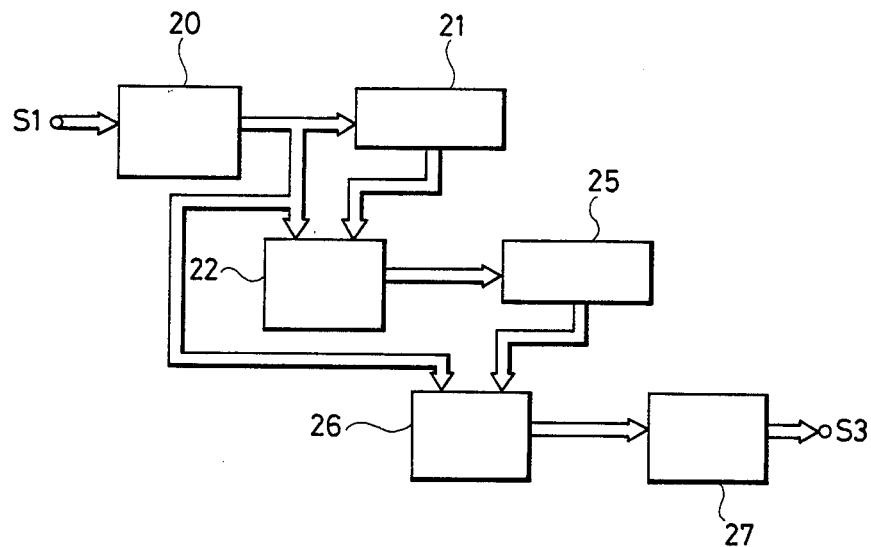
FIG. 11 is a block diagram of a circuit for displaying an image by averaging 6 pixels.

FIGS. 10 and 11 show an example of an arrangement of 6-frame images F1 to F6 as shown in FIG. 2. The memory 3 has a capacity for 6-frame data, i.e., a capacity of 2M×3N. When 1- or 4-frame data is displayed on the CRT 12, the mode of operation is the same as that described above.

When 6-frame data is displayed on the CRT 12, the X and Y address counters 4 and 5 generate addresses (1, 1) to (2M, 1), (1, 2) to (2M, 2), ..., and (1, 3N) to (2M, 3M). After the data read-out from the memory 3 in accordance with these addresses are calculated using the adders 20 and 22 and the line memory 21, they are calcualted using a line memory 25, an adder 26 and a divider 27 shown in FIG. 11. The operation up to the output from the adder 22 is the same as the previous embodiment. The output from the adder 22 comprises a 4-pixel sum output. In other words, the sum result of data at addresses (1, 1)+(2, 1)+(1, 2)+(2, 2), (3, 1)+(4, 1)+(3, 2)+(4, 2), ..., (2M-1, 1)+(2M, 1)+(2M-1, 2)+(2M, 2) is produced from the adder 22 as the data of 2 lines from the memory 3. In this embodiment, this data is stored in the line memory 25 similar to the line memory 24. Then, the third line of the data read-out from the memory 3 is added by the adder 22 to obtain (1, 3)+(2, 3), (3, 3)+(4, 3), ..., (2M-1, 3)+(2M, 3). This output is added to the output from the line memory 25 by the adder 26. The output from the adder 26 becomes (1, 1)+(2, 1)+(1, 2)+(2, 2)+(1, 3)+(2, 3), (3, 1)+(4, 1)+(3, 2)+(4, 2)+(3, 3)+(4, 3), ..., (2M-1, 1)+(2M, 1)+(2M-1, 2)+(2M, 2)+(2M-1, 3)+(2M+3), thereby obtaining a sum result of 2×3=6 pixels. When this result is divided by 6 by the divider 27, an average value of 6 pixels can be obtained. The calculated result is stored in the line memory 23 shown in FIG. 9. In a similar manner to that described above, synthetic images each consisting of an average value of 6 pixels are displayed on the CRT 12. When high luminance of the display images is not required, the divider 27 can be omitted. In this case, the lower 2 bits of the data are omitted to obtain the data which is ¼ the original image data. with this method, substantially the same result can be obtained.

In this embodiment, M is an even number, and N is a multiple of 3. However, if M and N cannot be divided by 2 and 3, the remaining pixels can be neglected and no notable problem occurs since the neglected pixels correspond to image edges.

FIG. 12 shows a block diagram of a circuit for performing averaging of pixel data in the X direction or row direction, and for performing extraction of pixel data in the Y direction or column direction. The image data read-out from the memory 3 is supplied to the CRT 12 through the switch S1, an adder circuit 20 consisting of a latch 20$a$ and an adder 20$b$, and a latch 28. The adder circuit 20 performs 1-pixel addition of the input data by the latch 20$a$ and the adder 20$b$. The latch 28 is a 1-pixel latch similar to the latch 20$a$ and controls the timing. It is to be noted that image data can be averaged in the column direction and can be extracted in the row direction.

FIGS. 13a to 13d show timing charts of the contents at points a to d in the circuit shown in FIG. 12. The latches 20a and 28 latch pixel data in accordance with a timing pulse (not shown) so as to add two adjacent pixels as shown in FIG. 13d. In the case shown in FIG. 12, since 2 pixels are added, as in the case of FIG. 9, the data can be averaged by switching the LSB of the output from the latch 28. As can be seen from a comparison of the signals at the points a and d, the X address counter 4 is driven by a clock of at a rate twice that of the clock output C1.

The Y address counter 5 is also driven by a clock of a rate twice that for a case wherein 1-frame data is displayed. When the LSB of the output from the Y address counter 5 is disabled, the Y addresses are interlaced, and average values of $(1, 1)+(2, 1), \ldots, (2M-1, 1)+(2M, 1), (1, 3)+(2, 3), \ldots, (2M-1, 3)+(2M, 3), \ldots, (1, 2N-1)+(2, 2N-1) \ldots, (2M-1, 2N-1)+(2M, 2N-1)$ are displayed on the CRT 12.

According to this embodiment, as can be seen from a comparison of FIGS. 9 and 12, the line memory 21, the adder 22, the line memories 23 and 24, and the switches S3 and S4 as shown in FIG. 9 can be omitted, and therefore hardware can be simplified.

Figure 14:
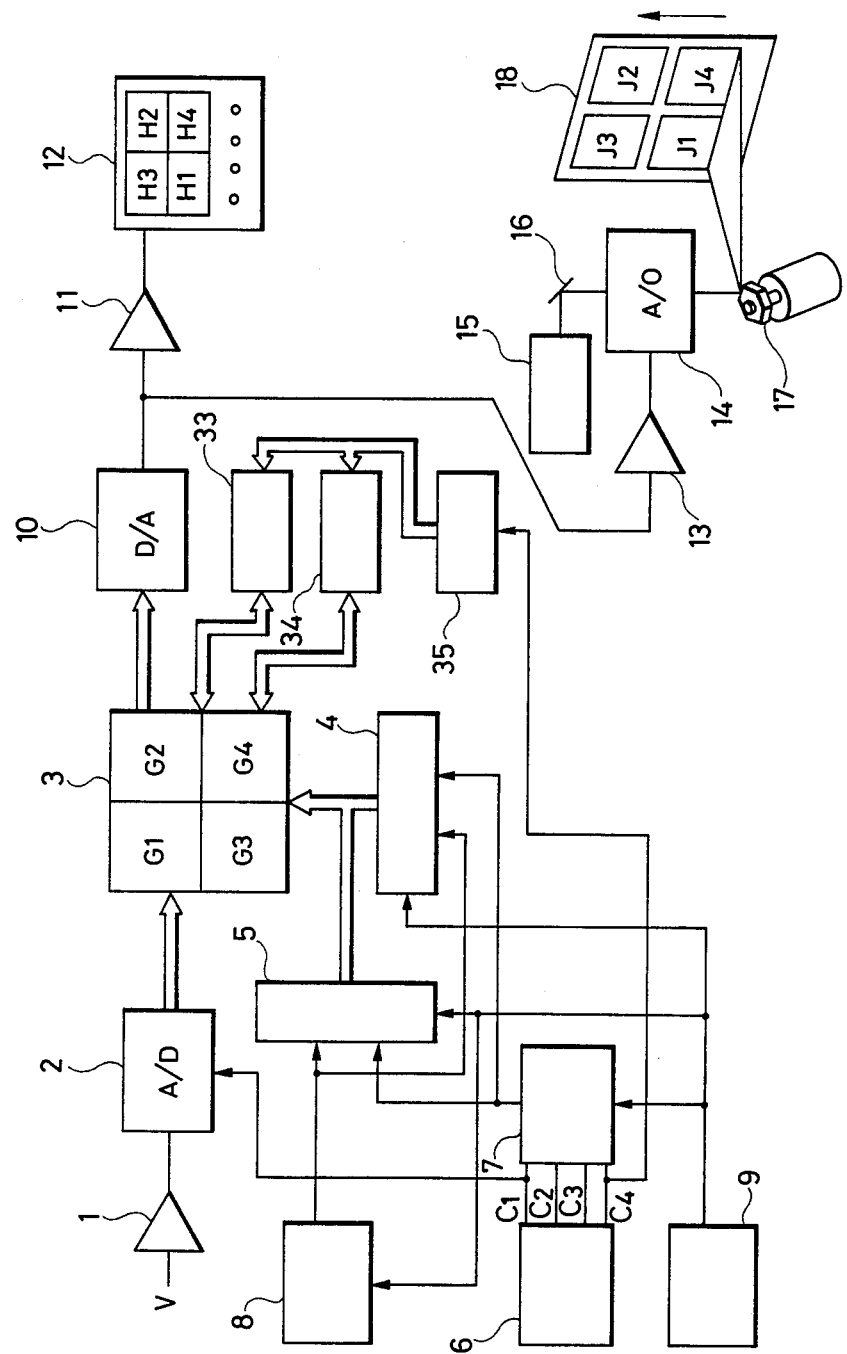
FIG. 14 is a block diagram of still another embodiment of the present invention having a function of changing an image arrangement and a function of displaying the changed image arrangement.

FIG. 14 shows another embodiment of the present invention wherein a recording image arrangement can be changed as needed, and the changed recording image arrangement can be displayed on a CRT. The same reference numerals as in the previous embodiments denote the same parts in this embodiment.

When the image arrangement is to be changed, for example, when images H1 and H3 displayed on a CRT 12 are replaced with each other, the image data in areas G1 and G3 in a memory 3 can be replaced with each other. More specifically, the image data at the addresses (1, 1) to (M, N) and (1, N+1) to (M, 2N) shown in FIG. 5 are replaced with each other. In order to perform this operation, a controller 9 is set in the image switching mode first. A high-speed clock output C4 from a clock pulse generator 6 is selected as an output therefrom by a multiplexer 7. The output C4 is used to drive an X address counter 4, a Y address counter 5, and an address counter 35 for accessing buffer line memories 33 and 34.

First, a frame counter 8 is set with a frame number 1 so as to read-out 1-line image from the area G1 of the memory 3 and to store the read-out image data in the line memory 33. Pixels at the addresses (1, 1) to (M, 1) of the memory 3 are stored in the line memory 33. Second, the frame counter 8 is set with a frame number 3 so as to read out 1-line image data from the area G3 of the memory and to store the read-out image data in the line memory 34. Thus, pixels at the addresses (1, N+1) to (M, N+1) of the memory 3 are stored in the line memory 34. Third, pixels stored in the line memory 33 are written at the addresses (1, N+1) to (M, N+1) of the memory 3. Fourth, the frame counter 8 is set at a frame number 1 so as to write the pixels stored in the line memory 34 at the addresses (1, 1) to (M, 1) of the memory 3. These four steps can be performed in one cycle so as to replace the image data in the areas G1 and G3 with each other. The first and second steps, and third and fourth steps can be performed in the reverse order, respectively. When such cycles are performed N times, all the image data in the areas G1 and G3 can be replaced with each other. Although, in the above description, image data in the areas G1 and G3 are replaced with each other in units of horizontal lines, they can be replaced with each other in units of vertical lines and replacement can be commenced from any line.

When replacement of image data in the memory 3 is completed and the replaced image data are displayed on the CRT 12, the CRT 12 displays the images in the order of H3, H2, H1, and H4.

After confirming the image arrangement in the memory 3 in this manner, a clock output C3 synchronized with a recording apparatus is selected by the controller 9 and the multiplexer 7. The X and Y address counters 4 and 5 generate addresses (1, 1) to (2M, 1), (1, 2) to (2M, 2), ..., (1, 2N) to (2M, 2N) so as to read-out image data at these addresses of the memory 3 and to record the read-out image data.

Although the line memories 33 and 34 are used in the above embodiment, they can be replaced with 1-pixel memories so as to perform replacement of areas G1 and G3 in units of pixels. Furthermore, the line memories 33 and 34 can also be replaced with frame memories.

Figure 15:
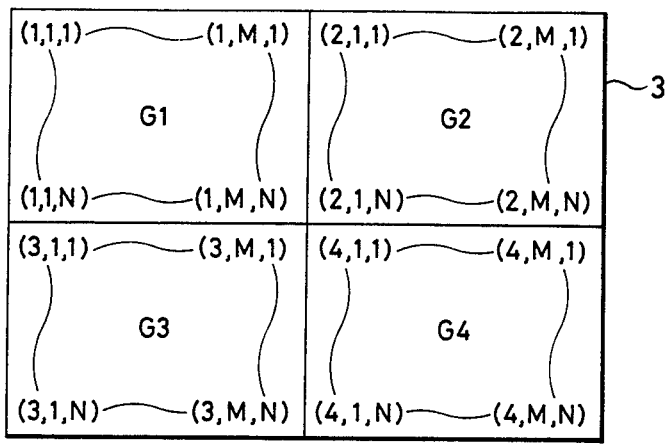
FIG. 15 is an illustration for explaining the state wherein image data of 4 frames is stored.
Figure 16:
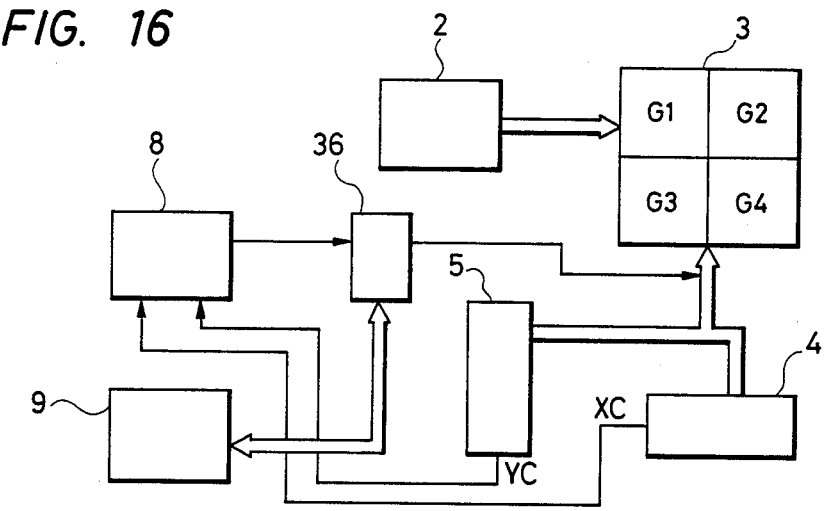
FIGS. 16 and 17A, 17B and 17C are for explaining a modification for changing an image arrangement by address conversion.

In a modification shown in FIGS. 15, 16 and 17, the image arrangement is changed by address conversion without performing image data transfer within the memory 3 as in the previous embodiment. In the above embodiment, hardware such as the line memories 33 and 34 and the address counter 35 is required, and image data replacement between the areas G1 and G3 is time-consuming. However, the modification shown in FIGS. 15 to 17 resolves these problems.

In this modification, addresses of the memory 3 shown in FIG. 14 are not all consecutive addresses as shown in FIG. 5 but are addresses independently including frame numbers and pixel numbers in each image as shown in FIG. 15. These addresses are assigned to all the pixels of the images F1 to F4.

Since this modification can be achieved by modifying only a part of the embodiment shown in FIG. 14, only such a part different from the embodiment shown in FIG. 14 will be described with reference to FIG. 16. In this modification, the memory 3 has a format as shown in FIG. 15, and the line memories 33 and 34 and the address counter 35 can be omitted. Referring to FIG. 16, an A/D converter 2, a memory 3, an X address counter 4, a Y address counter 5, a frame counter 8 and a controller 9 can be the same as those in FIG. 14. However, the X and Y address counters 4 and 5 are M- and N-base counters which are not controlled by the frame counter 8. A frame number output from the frame counter 8 is converted by a programmable memory 36 so as to access the memory 3. In other words, the output from the memory 36 is the first digit shown in FIG. 15. The output from the frame counter 8 designates an address of the memory 36 which then produces the corresponding content. The memory 36 serves as a look-up table and is updated by the controller 9. FIG. 17 shows the addresses and contents of the memory 36.

Figure 17A:
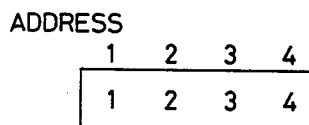

When an input image signal V is written in the memory 3, the memory 36 is in the state as shown in FIG. 17A. In this case, when 1 is produced from the frame counter 8, 1 is produced from the memory 36. In other words, the outputs from the frame counter 8 and the memory 36 correspond to each other, and image data of images F1 to F4 are written in areas G1 to G4 of the memory 3. When the data in the memory 3 is read-out and displayed, the output from the frame counter 8 is initially 1. When the X address counter 4 is incremented by M, the output from the frame counter 8 changes to 2.

When the X address counter 4 is incremented by M again, the output from the frame counter 8 is changed to 1. In this manner, the frame counter 8 alternately produces 1 and 2, N times, every time the X address counter 4 is incremented by M. When the Y address counter 5 is incremented by N upon this operation, the frame counter 8 now alternately produces 3 and 4, N times, every time the X address counter 4 is incremented by M. This operation can be achieved by controlling the frame counter 8 by a carry signal XC generated upon incrementation of the X address counter 4 by each M and by a carry signal YC generated upon incrementation of the Y address counter 5 by each N.

With this memory access method, the memory 3 is read-accessed in the order of addresses (1, 1, 1) to (1, M, 1), (2, 1, 1) to (2, M, 1), (1, 1, 2) to (1, M, 2), (2, 1, 2) to (2, M, 2), ..., (1, 1, N) to (1, M, N), (2, 1, N) to (2, M, N), (3, 1, 1) to (3, M, 1), (4, 1, 1) to (4, M, 1) to (3, 1, 2) to (3, M, 2), (4, 1, 2) to (4, M, 2), ..., (3, 1, N) to (3, M, N), and (4, 1, N) to (4, M, N). The images are displayed on the CRT 12 in the order of H1, H2, H3 and H4 as shown in FIG. 14.

Figure 17B:
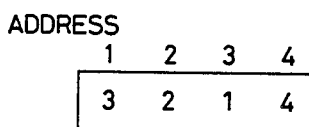

When the images F1 and F3 are to be replaced with each other, the contents at the addresses 1 and 3 of the memory 36 are replaced with each other as shown in FIG. 17B. In this case, when the frame counter 8 produces 1, the memory 36 produces 3. When the frame counter 8 produces 2, the memory 36 produces 2. When the frame counter 8 produces 3, the memory 36 produces 1. When the frame counter 8 produces 4, the memory 36 produces 4. The contents of the memory 36 are then rewritten as shown in FIG. 17B. When the image arrangement changed in this manner is displayed on a CRT 12, the memory 3 is read-accessed in the order of addresses (3, 1, 1) to (3, M, 1), (2, 1, 1) to (2, M, 1), (3, 1, 2) to (3, M, 2), (2, 1, 2) to (2, M, 2), ..., (3, 1, N) to (3, M, N), (2, 1, N) to (2, M, N), (1, 1, 1) to (1, M, 1), (4, 1, 1) to (4, M, 1), (1, 1, 2) to (1, M, 2), (4, 1, 2) to (4, M, 2), ..., (1, 1, N) to (1, M, N), and (4, 1, N) to (4, M, N). The images are displayed on the CRT 12 in the order of H3, H2, H1 and H4 as in the case of FIG. 14.

When the image arrangement is confirmed and the images are recorded in hard copies, as in the case of FIG. 14, the clock pulse signal C3 is selected. The image data in the memory 3 is read-out, and the addresses of the memory 3 are read-accessed in the same sequence as the display sequence. Images are recorded in the sequence of J3, J2, J1 and J4 on a silver chloride film 18, which is the same sequence as the display sequence on the CRT 12.

Figure 17C:
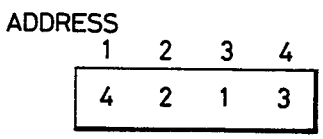

When the images F1 and F3 on the CRT 12, i.e., the images H3 and H4 are replaced with each other, the contents at the addresses 1 and 4 in FIG. 17B are replaced with each other. Then, the contents of the memory 36 become as shown in FIG. 17C, and the images are arranged in the sequence of H4, H2, H1 and H3.

Re-replacement of images as in this modification can also be performed in the embodiment in FIG. 14. In this manner, according to the present invention, the image arrangement can be changed any desired number of times. If the process of changing the arrangement of the image data in the memory 36 is stored, the original image arrangement can be restored, if so desired.

Processing of a larger number of pixels can be performed by increasing the memory capacity of the line memories 33 and 34 in the embodiment shown in FIG. 14 and by increasing the memory capacity of the memory 36 in the modification shown in FIG. 16. It is also possible to increase the number of images to be arranged from those shown in FIG. 1 to those shown in FIG. 2, or vice versa. This can be performed by changing the size of each image by changing the rotating speed of a rotating polyhedral mirror 17 and the moving speed of the film 18 relative to the mirror 17 as shown in FIG. 14.

Figure 18:
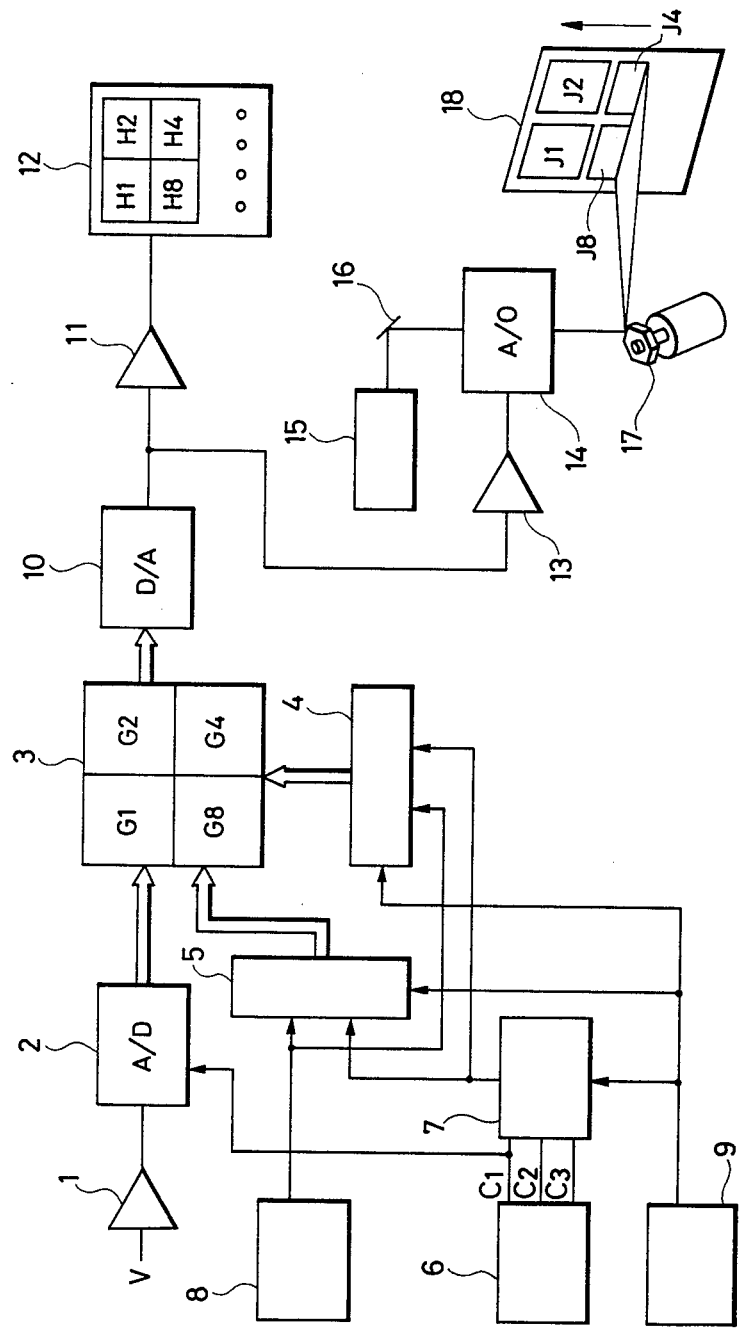
FIG. 18 is a block diagram of still another embodiment of the present invention having a function of replacing given image data with other image data and a function of displaying the changed image data on a CRT.

FIG. 18 shows still another embodiment of the present invention wherein image data can be replaced with image data other than that in a current image arrangement and the changed data can be displayed on a CRT.

When the image data of an area G3 is to be replaced with the image data of an area G8 referring to FIG. 18, a frame counter 8 is set with a frame number 3, 1 is preset in an X address counter 4, and N+1 is preset in a Y address counter 5. When a controller 9 is set in a write mode to select a signal C1 by a means of a multiplexer 7 and 8 is input, the X address counter 4 and the Y address counter 5 designate addresses of the area G3 of a memory 3. The image data of the area G8 is written at the memory location of the area G3 of the memory 3, and the data of the images G1, G2, G8 and G4 are written in the memory 3.

When a frame number is set in the frame counter 8 in this manner, any image data stored in the memory 3 can be replaced with other data. When the image arrangement of images H1, H2, H8 and H4 stored in the memory 3 is confirmed on a CRT 12, a clock signal C3 from a clock pulse generator 6 synchronized with a recording apparatus is selected by the controller 9 and the multiplexer 7. As in the case of image display, the X and Y address counters 4 and 5 generate addresses in the order of (1, 1) to (2M, 1), (1, 2) to (2M, 2), ..., (1, 2N) to (2M, 2N) so as to read-out corresponding data from the memory 3.

Figure 19:
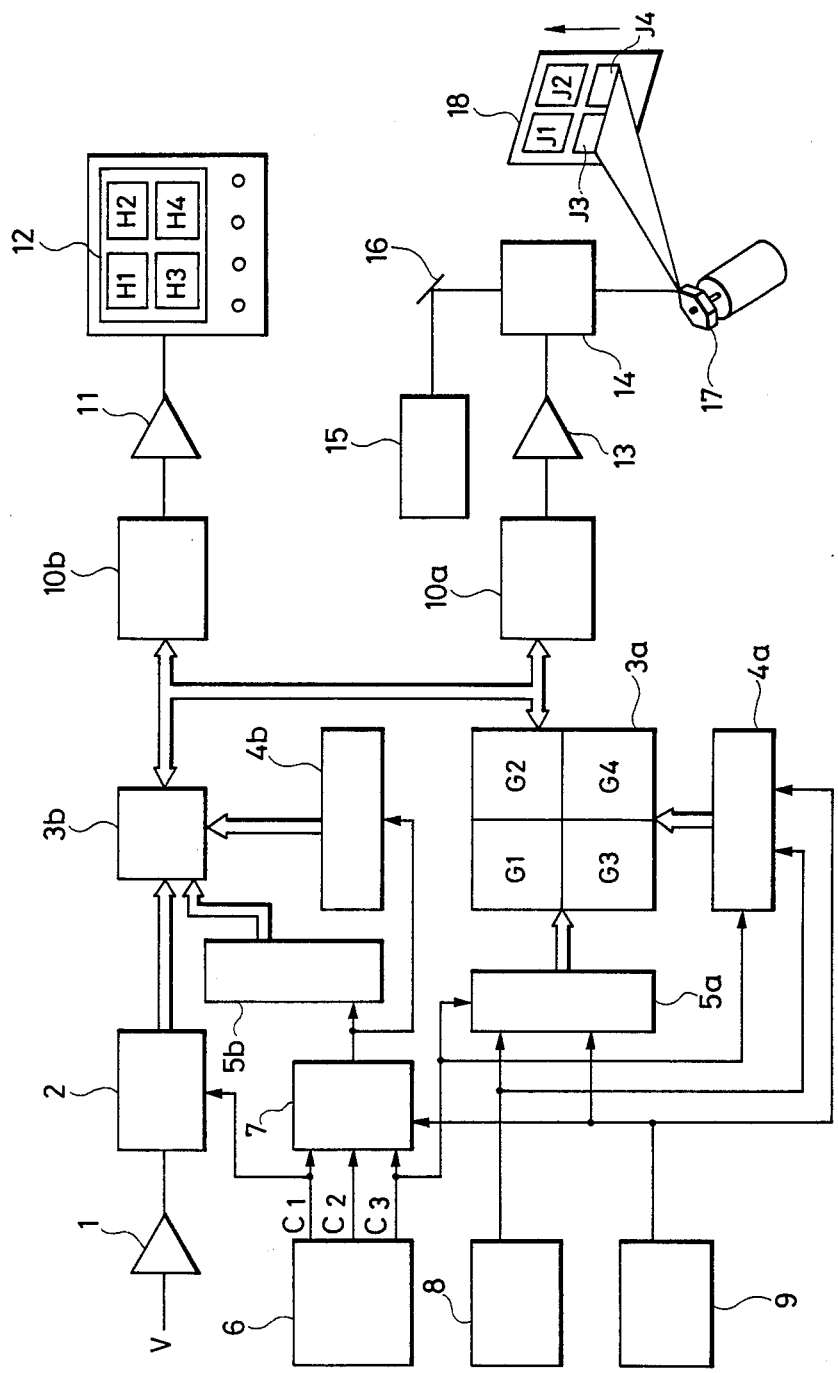
FIG. 19 is a block diagram of a still another embodiment of the present invention having a display image memory section for selectively storing all or some of images recorded in a memory for storing a plurality of image data.

FIG. 19 shows still another embodiment of the present invention in which a display memory for storing some or all of stored images is incorporated in addition to an image memory for storing a plurality of images.

An analog image signal V is supplied to an A/D converter 2 through an amplifier 1 and is thereby converted into a digital signal. The digital signal from the A/D converter 2 is stored in a display image memory 3b. Of signals C1', C2' and C3' supplied from a clock pulse generator 6, a multiplexer 7 selects the signal C1' which drives an X address counter 4b and a Y address counter 5b, thereby determining a write address of the display image memory 3b. When the signal C2' from the clock pulse generator 6 is selected, image data stored in the display image memory 3b is read-out and is displayed on the CRT 12 through a D/A converter 10b and an amplifier 11 in units of frames.

Image data stored in the display image memory 3b is transferred to a memory 3a for storing a plurality of images in response to the output C3' from the clock pulse generator 6. The image data stored in the display image memory 3b is driven by the signal C3' and is stored at addresses of the memory 3a which are determined by the X and Y address counters 4a and 5a. The address counters 4a and 5a are controlled by a frame counter 8.

The image data sequentially written in the display image memory 3b in this manner is sequentially transferred to the image memory 3a. The 4-frame image data is stored in the image memory 3a, and the input image data is displayed on the CRT 12 in units of frames.

When 4-frame image data G1 to G4 stored in the memory 3a are displayed on the CRT 12 in order to confirm the image arrangement, address counters 4a, 5a, 4b and 5b used for image data transfer to the image memory 3b are driven by the signal C3'. The address counters 4a and 5a are controlled by the controller 9 and produce all of the other addresses. This can be easily achieved by 1-bit shifting the outputs from the address counters 4a and 5a, as described above.

Image data stored in the display image memory is displayed as H1 to H4 on the CRT 12 after compression as shown in FIG. 19 thorugh the D/A converter 10b and the amplifier 11.

When the image arrangement is confirmed by observing the CRT 12, the image data stored in the image memory 3a drive an acoustic optical element 14 of a modulation means through a D/A converter 10a and an amplifier 13. Output light from a laser oscillator 15 is luminance-modulated by the A/O element 14 after being reflected by a mirror 16.

When image data is to be transferred from the display image memory 3b to the image memory 3a, the X address counter 4 serves as an M-base preset counter, and the Y address counter 5 serves as an N-base preset counter. When image data is to be transferred from the image memory 3a to the display image memory 3b, the X address counter 4a serves as a 2M-base counter and the Y address counter 5a serves as a 2N-base counter to perform 1-bit shift of the data. When the image is to be recorded on a film 18, the X address counter 4a serves as an M-base counter, and the Y address counter 5a serves as an N-base counter.

In the above embodiment, the display image memory 3b has a capacity of one frame. However, the memory capacity of a display image memory is not limited to one frame. If a display image memory used has a smaller capacity, every other or every third pixel can be extracted to synthesize an image.

When image data is transferred from the image memory 3a to the display image memory 3b, pixels are extracted to compress the image data. However, as described with reference to FIG. 9, every four pixels of the data in the image memory 3a can be average to store the compressed data in the memory 3b.

When an image contains characters, character recognition is hindered if pixels are extracted or interlaced. Therefore, in this case, a method of averaging every predetermined number of pixels is preferably adopted.

In the above description, input image data is first stored in the display image memory 3b and is then transferred to the image memory 3a. The image data is transferred from the memory 3a to the memory 3b. However, the image transfer sequence can be reversed. In other words, input image data can be stored in the memory 3a first and can then be transferred to the display image memory 3b when a need for display on the CRT 12 arises.

In the embodiments described above, the display is a CRT and the recording apparatus is a laser beam scanner. However, the present invention is not limited to this. For example, the display can be a liquid crystal display or a plasma display, and the recording apparatus can be an electron beam flat CRT scanning recorder, a photosensor element array scanning recorder or the like. The recording medium is not limited to a silver chloride film but an electrophotography medium can be adopted. The present invention can also be applied to digital image signals supplied through a suitable interface.

What is claimed is:

1. An image recording apparatus comprising:
   a memory for storing a plurality of frames of image data;
   recording means for reading out the frames of image data to be recorded from said memory and for recording a predetermined number of the frames of image data in a predetermined arrangement; and
   display means for reading out the frames of image data from said memory and for displaying the read out image data from memory, in substantially the same predetermined arrangement as that for recording, and in such a predetermined compressed mode as to decrease the number of pixes within the frame as compared with that upon recording.

2. An apparatus according to claim 1, wherein said recording means comprises modulating means for modulating a recording beam in accordance with the image data to be recorded read out from said memory, and scanning means for scanning the modulated recording beam relating to a recording medium.

3. An apparatus according to claim 1, wherein the image data is compressed by extracting pixels of the image data.

4. An apparatus according to claim 3, wherein every other pixel of the image data is extracted.

5. An apparatus according to claim 1, wherein a plurality of the pixels of the image data are averaged to make a single pixel so as to compress the image data.

6. An apparatus according to claim 5, further comprising selecting means for selecting whether or not averaging of the image data is to be performed.

7. An apparatus according to claim 1, wherein pixels are extracted in one of row and column directions, and each plurality of number of the pixels are averaged in the other direction to provide a single pixel, thereby compressing the image data.

8. An apparatus according to claim 1, wherein the arrangement of the image data displayed in the row direction is substantially the same as the arrangement of the image data recorded in the row direction.

9. An apparatus according to claim 7, wherein the number of image data displayed in the row direction is similar than that of the image data recorded in the row direction.

10. An apparatus according to claim 1, wherein an arrangement of the image data to be recorded can be changed, and the changed arrangement can be displayed.

11. An apparatus according to claim 9, wherein the arrangement is changed by changing an arrangement of the image data stored in said memory.

12. An apparatus according to claim 9, wherein the arrangement is changed by changing an address for accessing each pixel of said memory and for reading out the image data at the changed address.

13. An apparatus according to claim 1, wherein at least one frame of image data of the plurality of frames of image data stored in said memory can be replaced with different frames of image data, and an arrangement of changed image data can be displayed.

14. An apparatus according to claim 1, further comprising a display image memory for storing compressed image data for display.

* * * * *

UNITED STATES PATENT AND TRADEMARK OFFICE
CERTIFICATE OF CORRECTION

PATENT NO. : 4,710,821

DATED : December 1, 1987

INVENTOR(S) : SHINICHI OHTA

It is certified that error appears in the above-identified patent and that said Letters Patent is hereby corrected as shown below:

COLUMN 4

Line 23, "1), (2M,1)," should read
        --1), to (2M, 1),--.

COLUMN 6

Line 21, "3M)," should read --3N),--.
    Line 24, "calcualted" should read --calculated--.
    Line 52, "with" should read --With--.

COLUMN 7

Line 15, "of" should read --at--.

COLUMN 9

Line 18, "(4,M,1) to (3,1,2)" should read
        --(4,M,1), (3,1,2)--.

UNITED STATES PATENT AND TRADEMARK OFFICE
CERTIFICATE OF CORRECTION

PATENT NO. : 4,710,821

DATED : December 1, 1987

INVENTOR(S) : SHINICHI OHTA

It is certified that error appears in the above-identified patent and that said Letters Patent is hereby corrected as shown below:

COLUMN 11

Line 10, "thorugh" should read --through--.
    Line 42, "average" should read --averaged--.

COLUMN 12

Line 12, "read" should read --read---.
    Line 16, "pixes" should read --pixels--.
    Line 23, "relating" should read --relative--.

Signed and Sealed this

Twenty-fourth Day of May, 1988

Attest:

DONALD J. QUIGG

Attesting Officer

Commissioner of Patents and Trademarks